(12) United States Patent
Hu et al.

(10) Patent No.: US 9,644,543 B2
(45) Date of Patent: May 9, 2017

(54) PREDICTION OF INTAKE MANIFOLD PRESSURE IN AN ENGINE SYSTEM

(71) Applicant: GM GLOBAL TECHNOLOGY OPERATIONS LLC, Detroit, MI (US)

(72) Inventors: Yiran Hu, Shelby Township, MI (US); Ibrahim Haskara, Macomb, MI (US); Shifang Li, Shelby Township, MI (US); Sai S. V. Rajagopalan, Bloomfield Hills, MI (US); Steven E Muldoon, Royal Oak, MI (US); Chen-Fang Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 165 days.

(21) Appl. No.: 14/623,819

(22) Filed: Feb. 17, 2015

(65) Prior Publication Data

US 2016/0237941 A1    Aug. 18, 2016

(51) Int. Cl.
*F02D 11/10* (2006.01)
*F02D 9/02* (2006.01)
(Continued)

(52) U.S. Cl.
CPC ........... *F02D 9/02* (2013.01); *F02D 41/0002* (2013.01); *F02D 41/18* (2013.01); *F02D 41/10* (2013.01);
(Continued)

(58) Field of Classification Search
CPC .... F02D 41/263; F02D 41/0002; F02D 41/18; F02D 2200/0406; F02D 2200/0408;
(Continued)

(56) References Cited

U.S. PATENT DOCUMENTS 5,270,935 A * 12/1993 Dudek ................ F02D 41/1401
123/480
6,016,460 A * 1/2000 Olin .................... F02D 41/0072
701/102

(Continued)

*Primary Examiner* — Hai Huynh
(74) *Attorney, Agent, or Firm* — Quinn IP Law

(57) ABSTRACT

An engine assembly includes an intake manifold and a manifold absolute pressure sensor configured to generate a current measured manifold absolute pressure ($MAP_M$) signal for the intake manifold. The assembly includes a throttle valve adjustable to control airflow to the intake manifold and a throttle position sensor configured to generate a current measured throttle position ($TP_M$) signal. A controller is operatively connected to the throttle valve and the manifold absolute pressure sensor and has a processor and tangible, non-transitory memory on which is recorded instructions for executing a method for determining a predicted manifold absolute pressure ($MAP_P$). Execution of the instructions by the processor causes the controller to determine the predicted manifold absolute pressure ($MAP_P$) based at least partially on a predicted throttle flow ($TF_P$) and the current measured manifold absolute pressure ($MAP_M$) signal.

18 Claims, 2 Drawing Sheets

(51) Int. Cl.
*F02D 41/18* (2006.01)
*F02D 41/00* (2006.01)
*F02D 41/10* (2006.01)

(52) U.S. Cl.
CPC ............... *F02D 2009/0225* (2013.01); *F02D 2009/0228* (2013.01); *F02D 2009/0294* (2013.01); *F02D 2200/0404* (2013.01); *F02D 2200/0406* (2013.01); *F02D 2200/0408* (2013.01); *F02D 2200/0414* (2013.01)

(58) Field of Classification Search
CPC ..... F02D 2200/0414; F02D 2200/0416; F02D 9/02; F02D 2009/0294; F02M 35/1038
USPC ............... 123/399; 701/103, 110; 73/114.31, 73/114.32, 114.33, 114.34, 114.36, 73/114.37
See application file for complete search history.

(56) References Cited

U.S. PATENT DOCUMENTS

| | | | |
|---|---|---|---|
| 6,701,282 B2* | 3/2004 | Ting | F02D 41/1401 702/138 |
| 7,010,413 B2 | 3/2006 | Dudek et al. | |
| 7,027,905 B1* | 4/2006 | Mladenovic | F02D 41/18 701/102 |
| 2013/0090836 A1* | 4/2013 | Culbertson | F02D 41/009 701/104 |
| 2014/0251282 A1* | 9/2014 | Kotwicki | F02D 41/18 123/481 |

\* cited by examiner

US 9,644,543 B2

PREDICTION OF INTAKE MANIFOLD PRESSURE IN AN ENGINE SYSTEM

TECHNICAL FIELD

The disclosure relates generally to prediction of intake manifold absolute pressure in an engine system, and more specifically, to prediction of air flow per cylinder in an engine system.

BACKGROUND

A vehicle typically includes an engine with an air intake manifold and an air inlet, such that air flows into the intake manifold through the air inlet. A manifold absolute pressure sensor is typically used to determine the absolute pressure of the air flow in the intake manifold.

SUMMARY

An engine assembly includes an intake manifold and a manifold absolute pressure sensor configured to generate a current measured manifold absolute pressure ($MAP_M$) signal for the intake manifold. The assembly includes a throttle valve adjustable to control airflow to the intake manifold and a throttle position sensor configured to generate a current measured throttle position ($TP_M$) signal. A controller is operatively connected to the throttle valve. The controller has a processor and tangible, non-transitory memory on which is recorded instructions for executing a method for determining a predicted manifold absolute pressure ($MAP_P$). Execution of the instructions by the processor causes the controller to determine the predicted manifold absolute pressure ($MAP_P$) based at least partially on a predicted throttle flow ($TF_P$) and the current measured manifold absolute pressure ($MAP_M$) signal.

The controller is configured to generate a current commanded throttle position ($TP_C$) signal. Determining the predicted throttle position ($TP_P$) includes calculating the predicted throttle position ($TP_P$) as a function of the current measured throttle position ($TP_M$) signal and the current commanded throttle position ($TP_C$) signal.

An upstream temperature sensor may be positioned upstream of the throttle valve and configured to generate an upstream temperature ($T_U$) signal. An upstream pressure sensor may be positioned upstream of the throttle valve and configured to provide an upstream pressure ($P_U$) signal.

Determining the predicted throttle flow ($TF_P$) may include: determining a throttle area ($A_T$) at the predicted throttle position ($TP_P$); and calculating a condition factor ($F_1$) as a function of the upstream temperature ($T_U$) signal, current measured manifold absolute pressure ($MAP_M$) signal, and upstream pressure ($P_U$) signal.

The throttle area ($A_T$) may be obtained as: $A_T = A_{max}*(1-\text{cosine}(TP_P))$, such that $A_{max}$ is a predefined maximum throttle area and wherein the predicted throttle position ($TP_P$) is expressed as an angle between 0 and 90°. The condition factor ($F_1$) may be defined as: $F_1 = P_U * \psi / \sqrt{RTu}$; and wherein $\psi = $ Square root of $\{2k*((MAP_M/P_U)^{2/k} - (MAP_M/P_U)^{(k+1)/k})/(k-1)\}$, such that k is a predefined constant.

Determining the predicted throttle flow ($TF_P$) may further include: selecting a flow calibration factor ($L_1$) at the predicted throttle position ($TP_P$) signal from a first look-up table; and calculating the predicted throttle flow ($TF_P$) as a product of the first calibration factor ($L_1$), the throttle area ($A_T$) and condition factor ($F_1$) such that: $TF_P = L_1 * A_T * F_1$.

An engine is operatively connected to the intake manifold. An engine speed sensor is operatively connected to the engine and configured to generate an RPM signal. A camshaft assembly is operatively connected to the engine. A camshaft position sensor is operatively connected to the camshaft assembly and configured to generate current measured camshaft position ($CP_M$) signal.

A manifold temperature sensor is operatively connected to the intake manifold and configured to generate manifold temperature ($T_M$) signal. The intake manifold defines a manifold volume ($V_M$). The engine includes a number of cylinders ($n_{cyl}$), such that each of the number of cylinders defines a cylinder volume ($V_{cyl}$) and the number of cylinders ($n_{cyl}$) is at least one. The engine defines a sampling time ($t_s$) based at least partially on the RPM signal and the number of cylinders ($n_{cyl}$) such that: $t_s = 120/(RPM*n_{cyl})$.

The controller is configured to select a second calibration factor ($L_2$) from a second look-up table based at least partially on the current measured manifold absolute pressure ($MAP_M$) signal, the RPM signal and the current measured cam position ($CP_M$) signal. The controller is configured to determine a current air flow per cylinder ($APC_C$) as a function of the second calibration factor ($L_2$), the current measured manifold absolute pressure ($MAP_M$) signal, the cylinder volume ($V_{cyl}$) and the manifold temperature ($T_M$) signal. The current air flow per cylinder ($APC_C$) may be defined as: $APC_C = (L_2 * MAP_M * V_{cyl})/(R*T_M)$, where R is a predefined gas constant.

Determining the predicted manifold absolute pressure ($MAP_P$) includes calculating the predicted manifold absolute pressure ($MAP_P$) at least partially as a function of the current air flow per cylinder ($APC_C$), current measured manifold absolute pressure ($MAP_M$) signal, the predicted throttle flow ($TF_P$), the manifold temperature ($T_M$) signal and the sampling time ($t_s$). The predicted manifold absolute pressure ($MAP_P$) may be defined as: $MAP_P = MAP_M + (TF_P * t_s - APC_C) R * T_M / V_M$, where R is a predefined gas constant.

The controller may be configured to determine a predicted air flow per cylinder ($APC_P$) at least partially as a function of the predicted future manifold absolute pressure ($MAP_P$), a third calibration factor ($L_3$), the cylinder volume ($V_{cyl}$) and the manifold temperature ($T_M$) signal. The predicted air flow per cylinder ($APC_P$) may be defined as: $APC_P = (MAP_P * L_3 * V_{cyl})/(R*T_M)$.

In summary, the intake manifold absolute pressure is predicted by using information provided by the electronic throttle control and the dynamics of the pressure in the intake manifold. The commanded throttle position for the electronically-controlled throttle valve is used to predict the future throttle position. The predicted throttle position is used to predict the future throttle mass air flow. The predicted throttle mass air flow is used to predict the future intake manifold absolute pressure, which is useful for various purposes. Prediction of the intake manifold absolute pressure allows for prediction of the air flow per cylinder in the engine system, which may be employed for commanding the cylinder fuel.

The above features and advantages and other features and advantages of the present disclosure are readily apparent from the following detailed description of the best modes for carrying out the disclosure when taken in connection with the accompanying drawings.

DETAILED DESCRIPTION

Figure 1:
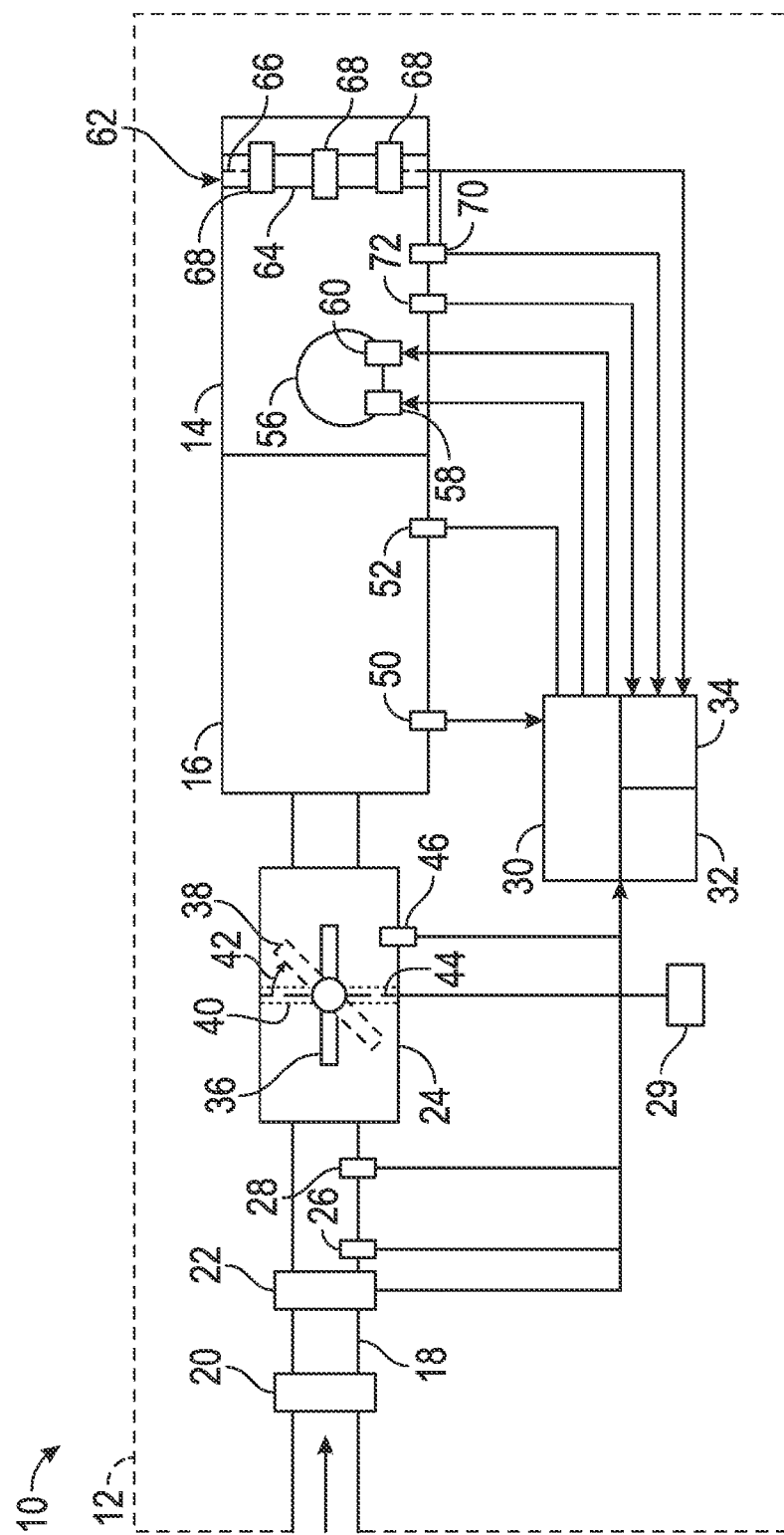
FIG. 1 is a schematic fragmentary view of a vehicle having an engine and an intake manifold.

Referring to the Figures, wherein like reference numbers refer to the same or similar components throughout the several views, FIG. 1 shows a vehicle 10 having an engine system 12. The engine system 12 includes an engine 14 operatively connected to an intake manifold 16. An air inlet 18 enables a flow of air into the intake manifold 16 from an external source, such as the atmosphere. An air filter 20, a mass air flow sensor 22 and a throttle valve 24 are located along the air inlet 18.

Referring to FIG. 1, a controller 30 is operatively connected to the engine 14 and various other components of the engine 14. Referring to FIG. 1, the controller 30 has a processor 32 and tangible, non-transitory memory 34 on which are recorded instructions for executing a method 100, described below with reference to FIG. 2, for determining a predicted manifold absolute pressure ($MAP_P$) of the air flow in the intake manifold 16.

The controller 30 may be an integral portion of, or a separate module operatively connected to, other control modules of the vehicle 10, such as the engine control module. The vehicle 10 may be any passenger or commercial automobile such as a hybrid electric vehicle, including a plug-in hybrid electric vehicle, an extended range electric vehicle, or other vehicles. The vehicle 10 may take many different forms and include multiple and/or alternate components and facilities. While an example vehicle is shown in the Figures, the components illustrated in the Figures are not intended to be limiting. Indeed, additional or alternative components and/or implementations may be used.

Referring to FIG. 1, the air filter 20 filters the air as it passes through the air inlet 18 to the engine 14 to remove dirt or debris. The mass air flow sensor 22 is configured to measure the mass of air flowing through the air inlet 18 entering the intake manifold 16. The throttle valve 24 is adjustable to regulate the air flowing into the intake manifold 16. An upstream temperature sensor 26 and an upstream pressure sensor 28 are each positioned upstream of the throttle valve 24, and configured to provide an upstream temperature ($T_U$) and upstream pressure ($P_U$).

The throttle manual control or accelerator pedal 29 of the vehicle 10 may be operatively connected to the controller 30. The accelerator pedal 29 sends a signal to the controller 30, which then directly controls the position of the throttle valve 24, providing electronic throttle control. Thus, the controller 30 is configured to generate a current commanded throttle position ($TP_C$) signal. The throttle valve 24 may be opened and closed to the commanded angle by an electric motor (not shown) in response to a control signal from the controller 30. The throttle valve 24 is shown in fully open position 36 (solid line), partially open position 38 (dashed line) and closed position 40 (dashed line). Referring to FIG. 1, the throttle position may be expressed as a throttle angle 42 between axis 44 and the throttle position (position 38 in FIG. 1). Throttle angle 42 may be between 0 and 90°, inclusive. A throttle position sensor 46 may be used to detect the position of the throttle valve 24.

Referring to FIG. 1, the engine system 12 includes a manifold absolute pressure sensor 50 which is operatively connected to the intake manifold 16 and capable of measuring and monitoring the pressure of the air inside the intake manifold 16. The manifold absolute pressure sensor 50 is configured to generate a current measured manifold absolute pressure ($MAP_M$) signal during an event. The event may be an intake event of the engine 14. As is known, the intake event for an engine 14 is when the air-fuel mixture is introduced to fill the combustion chamber (not shown). The intake event may be defined as the time period from just before the intake valve (not shown) opens to just after the intake valve closes. A manifold temperature sensor 52 is operatively connected to the intake manifold 16 and configured to generate manifold temperature ($T_M$) signal.

Referring to FIG. 1, the engine 14 includes at least one cylinder 56 having a fuel injector 58 and a spark plug 60. For illustration purposes, a single cylinder 56 is shown, however, it is to be understood that the engine 14 may include multiple cylinders with corresponding fuel injectors and spark plugs. In other words, the engine includes a number of cylinders ($n_{cyl}$) and the number of cylinders ($n_{cyl}$) is at least one. The controller 30 adjusts the flow of fuel through the fuel injector 58 based on the air flowing into the cylinder 56 to control the air-fuel-ratio (AFR) within the cylinder 56. An engine speed sensor 72 is operatively connected to the engine 14 and configured to generate an RPM signal.

Referring to FIG. 1, a camshaft assembly 62 is operatively connected to the engine 14. The camshaft assembly 62 includes a camshaft 64 rotatable about a cam axis 66 and a multiple lobes 68 operatively connected to the camshaft 64. While a single camshaft 64 is shown, it is to be understood that the engine 14 may include multiple camshafts rotatable about respective cam axes. The lobes 68 may be slidably attached to the camshaft 64 for axial movement along the camshaft 64 and for rotation with the camshaft 64 about the cam axis 66. A camshaft position sensor 70 may be operatively connected to the camshaft assembly 62 and configured to detect position of the camshaft assembly 62, i.e., generate a current measured camshaft position ($CP_M$) signal.

Figure 2:
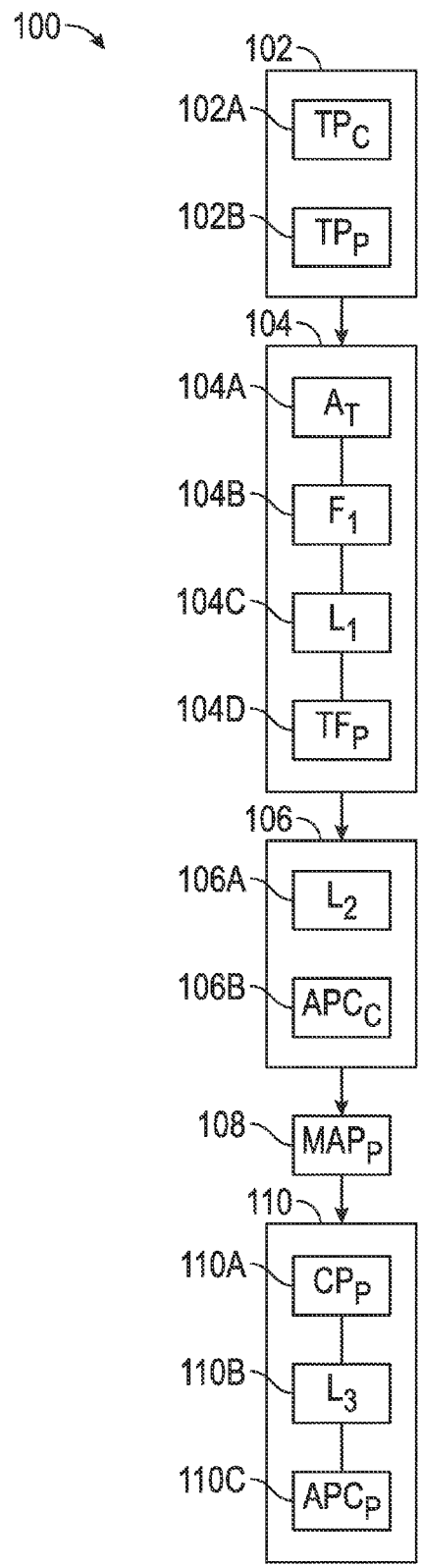
FIG. 2 is a flowchart for a method for determining a predicted manifold absolute pressure ($MAP_P$) of the intake manifold of FIG. 1.

Referring now to FIG. 2, a flowchart of a method 100 stored on and executable by the controller 30 of FIG. 1 is shown. Method 100 is described below with reference to FIGS. 1-2. Method 100 is employed for determining a predicted manifold absolute pressure ($MAP_P$). The intake manifold absolute pressure is predicted, at least in part, by using information provided by the electronically-controlled throttle valve 24 and the dynamics of the pressure in the intake manifold 16. Method 100 need not be applied in the specific order recited herein. Furthermore, it is to be understood that some steps may be eliminated.

Referring to FIG. 2, method 100 may begin with step 102 where the controller 30 determines a predicted throttle position ($TP_P$) based at least partially on the current measured throttle position ($TP_M$) signal. Step 102 includes sub-steps 102A and 102B. In step 102A, the controller 30 is configured to generate a current commanded throttle position ($TP_C$) signal. In step 102B, the controller 30 is configured to calculate the predicted throttle position ($TP_P$) as a function of the current commanded throttle position ($TP_C$) signal and the current measured throttle position ($TP_M$) signal. In one example, $TP_P = \alpha * TP_M + (1-\alpha) * TP_C$, such that a is a predefined parameter between 0 and 1, inclusive. In one example, a is approximately 0.7.

The method 100 proceeds to step 104 where the controller 30 determines a predicted throttle flow ($TF_P$) based at least partially on the predicted throttle position ($TP_P$). Step 104 includes sub-steps 104A, 104B, 104C and 104D. In step 104A, the controller 30 is configured to determine a throttle area ($A_T$) at the predicted throttle position ($TP_P$). The throttle area $A_T$ depends on the geometry of the particular throttle valve 24 used. In one embodiment, throttle area $A_T$ is defined as:

$$A_T = A_{max} * (1 - \text{cosine}(TP_P)),$$

such that $A_{max}$ is a predefined maximum throttle area and wherein the predicted throttle position ($TP_P$) is expressed as a throttle angle between 0 and 90°. In one example, throttle valve 24 is considered to be circular and $A_{max}$ is $(\pi * x^2/4)$, where x is the diameter of the throttle valve 24.

In step 104B, the controller 30 is configured to calculate a condition factor ($F_1$) based at least partially upon the upstream temperature ($T_U$) signal, current measured manifold absolute pressure ($MAP_M$) signal, and upstream pressure ($P_U$) signal. The condition factor ($F_1$) is a function of the upstream temperature ($T_U$) signal, current measured manifold absolute pressure ($MAP_M$) signal and the upstream pressure ($P_U$) signal. In one example:

$$F_1 = P_U * \psi / \sqrt{RT_U},$$

such that intermediate factor $\psi = $ Square root of $\{2k * ((MAP_M/P_U)^{2/k} - (MAP_M/P_U)^{(k+1)/k})/(k-1)\}$ and k is a predefined constant. In the embodiment shown, k is the ratio of the specific heat capacity at constant pressure $C_p$ to specific heat capacity at constant volume $C_v$ for a gas ($k=C_p/C_v$). The value of k is approximately 1.4 for air.

In step 104C, the controller 30 is configured to select the respective first calibration factor ($L_1$) at the predicted throttle position ($TP_P$) signal from a first look-up table. The controller 30 is configured to store the first look-up table defining respective first calibration factors ($L_1$) based on a plurality of throttle positions. To obtain the first lookup table, the throttle flow is measured in steady state with the mass air flow sensor 22 at various throttle angles 42 (see angle 42 in FIG. 1). The readings of the mass air flow sensor 22 provide the throttle flow measurement and the respective first calibration factors ($L_1$) are calculated based on the following equation and curve-fitted:

$$L_1 = \text{Throttle Flow Measurement}/(A_T * F_1).$$

Any other method of obtaining the respective first calibration factors ($L_1$) may be employed.

In step 104D, the controller 30 is configured to calculate the predicted throttle flow ($TF_P$) as a product of the first calibration factor ($L_1$), the throttle area ($A_T$) and condition factor ($F_1$) such that:

$$TF_P = L_1 * A_T * F_1.$$

In step 106, the controller 30 is configured to determine a current air flow per cylinder ($APC_C$), prior to determining the predicted manifold absolute pressure ($MAP_P$). The controller 30 is configured to store a second look-up table defining respective second calibration factors ($L_2$) based on the RPM signal (from the engine speed sensor 72), the current measured camshaft position ($CP_M$) signal and the current measured manifold absolute pressure ($MAP_M$) signal. The second look-up table may be constructed by calculating the second calibration factors ($L_2$) based on the following equation using sensor readings at various known air flow per cylinder values:

$$L_2 = APC/(MAP_M * V_{cyl})/(R * T_M)$$

Step 106 includes sub-steps 106A and 106B. In step 106A, the controller 30 is configured to select the second calibration factor ($L_2$) from the second look-up table at the current measured manifold absolute pressure ($MAP_M$) signal, the RPM signal (from the engine speed sensor 72) and the current measured cam position ($CP_M$) signal (from the camshaft position sensor 70).

In step 106B, the controller 30 is configured to calculate the current air flow per cylinder ($APC_C$) as:

$$APC_C = (L_2 * MAP_M * V_{cyl})/(R * T_M),$$

where R is a predefined gas constant, i.e., the universal gas constant. As noted above, the cylinder 56 of the engine 14 defines a volume ($V_{cyl}$).

The method 100 proceeds to step 108, where the controller 30 is configured to determine the predicted manifold absolute pressure ($MAP_P$) as a function of the current measured manifold absolute pressure ($MAP_M$) signal, the predicted throttle flow ($TF_P$), a sampling time ($t_s$), the current air flow per cylinder ($APC_C$), manifold volume ($V_M$) and manifold temperature ($T_M$) (from the manifold temperature sensor 52). The sampling time ($t_s$) may be defined as a function of the RPM signal and the number of cylinders ($n_{cyl}$) such that: $t_s = 120/(RPM * n_{cyl})$. In one embodiment, the controller 30 is configured to determine the predicted manifold absolute pressure ($MAP_P$) as:

$$MAP_P = MAP_M + (TF_P * t_s - APC_C) R * T_M/V_M.$$

In step 110, the controller 30 is configured to determine the predicted air flow per cylinder ($APC_P$) as a function of the predicted future manifold absolute pressure ($MAP_P$), a third calibration factor ($L_3$) (obtained from the second look-up table that was used in step 106A), the manifold temperature ($T_M$) signal (from the manifold temperature sensor 52) and the volume of the cylinder 56 in the engine 14. Step 110 includes sub-steps 110A, 110B and 110C.

In step 110A the controller 30 is configured to determine the predicted cam position ($CP_P$) as a function of the current commanded cam position ($CP_C$) and the current measured cam position ($CP_M$). The controller 30 is configured to generate a current commanded cam position ($CP_C$) for the camshaft assembly 62. In one example, the predicted cam position ($CP_P$) is calculated as:

$$CP_P = b * CP_M + (1-b) * CP_C,$$

such that b is a predefined parameter between 0 and 1, inclusive. In one example, b is 0.5.

In step 110B, the controller 30 is configured to select a third calibration factor ($L_3$) from the second look-up table, based on the predicted manifold absolute pressure ($MAP_P$) (obtained in step 108), measured RPM (from engine speed sensor 72) and the predicted cam position ($CP_P$) (obtained in step 110A). In step 110C, the controller 30 is configured to determine the predicted air flow per cylinder ($APC_P$) as a function of the predicted future manifold absolute pressure ($MAP_P$), the third calibration factor ($L_3$), the manifold temperature ($T_M$) signal (from the manifold temperature sensor 52) and the volume of the cylinder(s) 56 in the engine 14. In step 110C, the controller 30 is configured to determine the predicted air flow per cylinder ($APC_P$) as:

$$APC_P = (MAP_P * L_3 * V_{cyl})/(R * T_M),$$

where R is a predefined constant, i.e., the universal gas constant.

In summary, the commanded throttle position for the electronically-controlled throttle valve 24 is used to predict the future throttle position. The predicted throttle position is used to predict the future throttle mass air flow. The predicted throttle mass air flow is used to predict the future intake manifold absolute pressure, which is useful for various purposes. Prediction of the intake manifold absolute pressure allows for prediction of the air flow per cylinder in the engine system 12, which may be employed for commanding the cylinder fuel.

As noted above, the controller 30 of FIG. 1 may include a computing device that employs an operating system or processor 32 and memory 34 for storing and executing computer-executable instructions. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor 32 (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An engine assembly comprising:
an intake manifold;
an engine operatively connected to the intake manifold;
a manifold absolute pressure sensor configured to generate a current measured manifold absolute pressure ($MAP_M$) signal for the intake manifold;
a throttle valve adjustable to control airflow to the intake manifold;
a throttle position sensor configured to generate a current measured throttle position ($TP_M$) signal for the throttle valve; and
a controller operatively connected to the throttle valve and having a processor and tangible, non-transitory memory on which is recorded instructions for executing a method for determining a predicted manifold absolute pressure ($MAP_P$);
wherein execution of the instructions by the processor causes the controller to:
determine a predicted throttle position ($TP_P$) based at least partially on the current measured throttle position ($TP_M$) signal;
determine a predicted throttle flow ($TF_P$) based at least partially on the predicted throttle ($TP_P$);
determine the predicted manifold absolute pressure ($MAP_P$) based at least partially on the predicted throttle flow ($TF_P$) and the current measured manifold absolute pressure ($MAP_M$) signal; and
control the engine based at least partially on the predicted manifold absolute pressure ($MAP_P$).

2. The assembly of claim 1, further comprising:
an upstream temperature sensor positioned upstream of the throttle valve and configured to generate an upstream temperature ($T_U$) signal; and
an upstream pressure sensor positioned upstream of the throttle valve and configured to provide an upstream pressure ($P_U$) signal.

3. The assembly of claim 1:
wherein the controller is configured to generate a current commanded throttle position ($TP_C$) signal; and
said determining the predicted throttle position ($TP_P$) includes calculating the predicted throttle position ($TP_P$) as a function of the current measured throttle position ($TP_M$) signal and the current commanded throttle position ($TP_C$) signal.

4. The assembly of claim 1, wherein said determining the predicted throttle flow ($TF_P$) includes:
determining a throttle area ($A_T$) at the predicted throttle position ($TP_P$); and
calculating a condition factor ($F_1$) as a function of the upstream temperature ($T_U$) signal, current measured manifold absolute pressure ($MAP_M$) signal, and upstream pressure ($P_U$) signal.

5. The assembly of claim 4, wherein said throttle area ($A_T$) is obtained as: $A_T = A_{max}(1 - \cosine(TP_P))$, such that $A_{max}$ is a predefined maximum throttle area and wherein the predicted throttle position ($TP_P$) is expressed as an angle between 0 and 90°.

6. The assembly of claim 4, wherein the condition factor ($F_1$) is defined as: $F_1 = P_U * \psi / \sqrt{RTu}$; and wherein $\psi$=Square root of $\{2k*((MAP_M/P_U)^{2/k}-(MAP_M/P_U)^{(k+1)/k})/(k-1)\}$, such that k is a predefined constant.

7. The assembly of claim 4, wherein said determining the predicted throttle flow ($TF_P$) further includes:
   selecting a flow calibration factor ($L_1$) at the predicted throttle position ($TP_P$) signal from a first look-up table; and
   calculating the predicted throttle flow ($TF_P$) as a product of the first calibration factor ($L_1$), the throttle area ($A_T$) and condition factor ($F_1$) such that: $TF_P=L_1*A_T*F_1$.

8. The assembly of claim 1, further comprising:
   a camshaft assembly operatively connected to the engine;
   an engine speed sensor operatively connected to the engine and configured to generate an RPM signal; and
   a camshaft position sensor operatively connected to the camshaft assembly and configured to generate current measured camshaft position ($CP_M$) signal.

9. The assembly of claim 8, further comprising:
   a manifold temperature sensor operatively connected to the intake manifold and configured to generate manifold temperature ($T_M$) signal, the intake manifold defining a manifold volume ($V_M$);
   wherein the engine includes a number of cylinders ($n_{cyl}$), such that each of the number of cylinders defines a cylinder volume ($V_{cyl}$) and the number of cylinders ($n_{cyl}$) is at least one;
   wherein the engine defines a sampling time ($t_s$) based at least partially on the RPM signal and the number of cylinders ($n_{cyl}$) such that: $t_s=120/(RPM*n_{cyl})$.

10. The assembly of claim 9:
    wherein the controller is configured to select a second calibration factor ($L_2$) from a second look-up table based at least partially on the current measured manifold absolute pressure ($MAP_M$) signal, the RPM signal and the current measured cam position ($CP_M$) signal; and
    wherein the controller is configured to determine a current air flow per cylinder ($APC_C$) as a function of the second calibration factor ($L_2$), the current measured manifold absolute pressure ($MAP_M$) signal, the cylinder volume ($V_{cyl}$) and the manifold temperature ($T_M$) signal.

11. The assembly of claim 10, wherein the current air flow per cylinder ($APC_C$) is defined as: $APC_C=(L_2*MAP_M*V_{cyl})/(R*T_M)$, where R is a predefined gas constant.

12. The assembly of claim 10, wherein said determining the predicted manifold absolute pressure ($MAP_P$) includes calculating the predicted manifold absolute pressure ($MAP_P$) at least partially as a function of the current air flow per cylinder ($APC_C$), current measured manifold absolute pressure ($MAP_M$) signal, the predicted throttle flow ($TF_P$), the manifold temperature ($T_M$) signal and the sampling time ($t_s$).

13. The assembly of claim 10, wherein the predicted manifold absolute pressure ($MAP_P$) is defined as: $MAP_P=MAP_M+(TF_P*t_s-APC_C) R*T_M/V_M$, where R is a predefined gas constant.

14. The assembly of claim 10, wherein the controller is configured to determine a predicted air flow per cylinder ($APC_P$) at least partially as a function of the predicted future manifold absolute pressure ($MAP_P$), a third calibration factor ($L_3$), the cylinder volume ($V_{cyl}$) and the manifold temperature ($T_M$) signal.

15. The assembly of claim 14, wherein the predicted air flow per cylinder ($APC_P$) is defined as: $APC_P=(MAP_P*L_3*V_{cyl})/(R*T_M)$.

16. A vehicle comprising:
    an intake manifold;
    an engine operatively connected to the intake manifold;
    a manifold absolute pressure sensor configured to generate a current measured manifold absolute pressure ($MAP_M$) signal for the intake manifold;
    a throttle valve adjustable to control airflow to the intake manifold;
    a throttle position sensor configured to generate a current measured throttle position ($TP_M$) signal for the throttle valve;
    a controller operatively connected to the throttle valve and having a processor and tangible, non-transitory memory on which is recorded instructions for executing a method for determining a predicted manifold absolute pressure ($MAP_P$);
    wherein execution of the instructions by the processor causes the controller to:
       determine a predicted throttle position ($TP_P$) based at least partially on the current measured throttle position ($TP_M$) signal;
       determine a predicted throttle flow ($TF_P$) based at least partially on the predicted throttle position ($TP_P$);
       determine the predicted manifold absolute pressure ($MAP_P$) based at least partially on the predicted throttle flow ($TF_P$) and the current measured manifold absolute pressure ($MAP_M$) signal;
       control the engine based at least partially on the predicted manifold absolute pressure ($MAP_P$); and
    wherein said determining the predicted manifold absolute pressure ($MAP_P$) includes calculating the predicted manifold absolute pressure ($MAP_P$) at least partially as a function of a current air flow per cylinder ($APC_C$), the current measured manifold absolute pressure ($MAP_P$) signal, the predicted throttle flow ($TF_P$), a manifold temperature ($T_M$) signal and a sampling time ($t_s$).

17. The vehicle of claim 16, wherein the controller is further configured to determine a predicted air flow per cylinder ($APC_P$) at least partially as a function of the predicted future manifold absolute pressure ($MAP_P$), a third calibration factor ($L_3$), a cylinder volume ($V_{cyl}$) and a manifold temperature ($T_M$) signal.

18. A method for determining a predicted manifold absolute pressure ($MAP_F$) for an intake manifold in an engine assembly having a controller, an engine and a throttle valve, the method comprising:
    generating a current measured manifold absolute pressure ($MAP_M$) signal for the intake manifold with a manifold absolute pressure sensor;
    generating a current measured throttle position ($TP_M$) signal for the throttle valve with a throttle position sensor;
    determining a predicted throttle position ($TP_P$) for the throttle valve based at least partially on the current measured throttle position ($TP_M$) signal;
    determining a predicted throttle flow ($TF_P$) based at least partially on the predicted throttle position ($TP_P$);
    determining the predicted manifold absolute pressure ($MAP_P$) based at least partially on the predicted throttle flow ($TF_P$) and the current measured manifold absolute pressure ($MAP_M$) signal; and
    controlling the engine based at least partially on the predicted manifold absolute pressure ($MAP_P$).

* * * * *